US006514894B1

(12) United States Patent
Adair et al.

(10) Patent No.: US 6,514,894 B1
(45) Date of Patent: Feb. 4, 2003

(54) CERAMIC SLIP COMPOSITION AND METHOD FOR MAKING THE SAME

(75) Inventors: James H. Adair, Gainesville, FL (US); Stephen A. Costantino, Oley, PA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/693,407

(22) Filed: Oct. 20, 2000

Related U.S. Application Data

(63) Continuation of application No. 08/874,798, filed on Jun. 13, 1997, now Pat. No. 6,214,756, which is a continuation of application No. 08/299,690, filed on Sep. 1, 1994, now abandoned.

(51) Int. Cl.$^7$ .............................................. C04B 35/46
(52) U.S. Cl. ....................... 501/134; 501/136; 501/137; 423/598
(58) Field of Search ................................ 501/134, 136, 501/137; 423/598

(56) References Cited

U.S. PATENT DOCUMENTS

| | | | |
|---|---|---|---|
| 2,964,413 | A | 12/1960 | Merker |
| 3,496,008 | A | 2/1970 | Haskins et al. |
| 3,551,197 | A | 12/1970 | Lindquist, Jr. |
| 4,086,649 | A | 4/1978 | Hanold III |
| 4,540,676 | A | 9/1985 | Chu et al. |
| 4,613,648 | A | 9/1986 | Usala |
| 4,643,984 | A | 2/1987 | Abe et al. |
| 4,829,033 | A | 5/1989 | Menashi et al. |
| 4,832,939 | A | 5/1989 | Menashi et al. |
| 4,863,883 | A | 9/1989 | Menashi et al. |
| 4,882,305 | A | 11/1989 | Chu et al. |
| 4,904,411 | A | 2/1990 | Novich et al. |
| 4,939,108 | A | 7/1990 | Dean |

(List continued on next page.)

FOREIGN PATENT DOCUMENTS

| | | |
|---|---|---|
| DE | 2248 681 | 4/1973 |
| DE | 42 12 514 | 10/1993 |
| EP | 0 532 114 | 3/1993 |
| JP | 58 215 491 | 12/1983 |
| JP | 03 159 903 | 7/1991 |
| JP | 05 124 802 | 5/1993 |
| WO | WO 88/07902 | 10/1988 |
| WO | WO 88/07903 | 10/1988 |

OTHER PUBLICATIONS

B. Jaffe, Piezoelectric Ceramics, 1971, Academic Press, Chapter 5, pp. 53–114.

S. Bruno et al., "High Performance Multilayer Capacitor Dielectrics from Chemically Prepared", May 1993, Journal of the American Ceramics Society, vol. 76, No. 5, pp. 1233–1241.

Application No. PCT/US95/10848, International Search Report dated Feb. 16, 1996.

Introduction to Principles of Ceramic Processing, REED, 1988, pp. 395–400.

Primary Examiner—Paul Marcantoni

(57) ABSTRACT

A uniform suspension of ceramic powder and method for making the same. The suspension is prepared by mixing finely divided ceramic powder in an aqueous carrier fluid, combining with a dispersing agent, and alternatively, an organic binder when forming a slip. The ceramic powder has an average particle size of about 0.5 micron or less and is present in the suspension in a loading of up to 30% by volume of the total solids in suspension. A passivating agent is present in the carrier fluid in an amount of 0.5 to 5% by weight of the ceramic powder present for suspension and slip respectively. After the addition of a dispersant, the suspension has a Bingham yield point of less than 230 dynes/cm$^2$ and an apparent viscosity of less than 3000 cps. A green layer produced from the slip exhibits a pore size of less than 0.5 micron.

32 Claims, 14 Drawing Sheets

U.S. PATENT DOCUMENTS

Figure 1A:
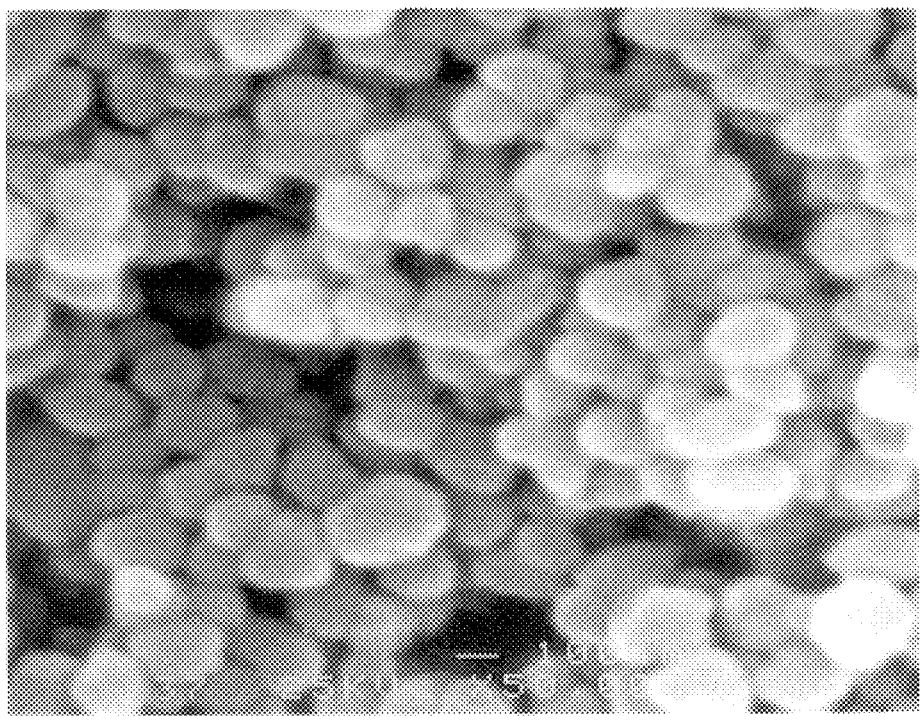

| | | |
|---|---|---|
| 4,968,460 A | 11/1990 | Thompson et al. |
| 5,011,804 A | 4/1991 | Bergna et al. |
| 5,082,810 A | 1/1992 | Bergna et al. |
| 5,082,811 A | 1/1992 | Bruno |
| 5,084,424 A | 1/1992 | Abe et al. |
| 5,086,021 A | 2/1992 | Sasaki et al. |
| 5,128,289 A | 7/1992 | Wilson |
| 5,196,388 A | 3/1993 | Shyu |
| 5,258,338 A | 11/1993 | Maher |
| 5,296,426 A | 3/1994 | Burn |
| 5,362,472 A | 11/1994 | Lauter et al. |
| 5,362,693 A | 11/1994 | Chu et al. |
| 6,214,756 B1 * | 4/2001 | Adair et al. ............... 501/134 |

* cited by examiner

CERAMIC SLIP COMPOSITION AND METHOD FOR MAKING THE SAME

This application is a continuation application of application Ser. No. 08/874,798, filed Jun. 13, 1997, now U.S. Pat. No. 6,214,756, entitled CERAMIC SLIP COMPOSITION AND METHOD FOR MAKING THE SAME, which is a file wrapper continuation of application Ser. No. 08/299,690, filed Sep. 1, 1994 now abandoned.

FIELD OF THE INVENTION

The present invention pertains to improved aqueous ceramic suspensions, slips, and ceramic green bodies and methods for producing the same. In particular, the present invention pertains to the use of an optimal range of passivating and dispersing agents in an aqueous suspension of finely divided ceramic powder.

BACKGROUND OF THE INVENTION

The importance of being able to produce thinner dielectric layers is becoming increasingly recognized by the producers of multilayer capacitors (MLC's) due to end user requirements of reduced size and cost. These capacitors are typically manufactured by co-firing, i.e., sintering a ceramic dielectric formulation and a conductive electrode material in an oxidizing atmosphere at a temperature in the range of about 1000° to 1400° C.

Dielectric layers have traditionally been produced by preparing a suspension of ceramic powder in a liquid vehicle, usually containing a dispersant, and then adding an organic resin matrix which functions to bind the ceramic particles within the suspension. A variety of methods are known for applying the suspension and binder mixture (hereafter defined as slip) to a substrate to form very thin layers of the suspended solids. Methods such as wet coating, tape-casting (casting), or doctor-blading are readily known to those skilled in the art. The thin, dried layers generally termed as green layers, may then be coated with conductive electrodes and stacked together with similar layers to form a green body. The stack is then trimmed and co-fired to produce a structure consisting of alternating layers of sintered electrode and dielectric which is finally leaded with end terminations to form the finished capacitor. Suspensions used for dielectric compositions in the past have used both aqueous and organic liquids, but because of the environmental and safety concerns, the tendency has been to increase the use of aqueous suspensions for making the dielectric layers.

Another trend in the capacitor industry has been to make the dielectric layers thinner to obtain more capacitance per unit volume. Therefore, the thickness of dielectric layers have been reduced from 25 microns to 10 microns. It is now desirable to reduce the thickness to 5 microns or less. These thinner layers necessitate the use of extremely small solid ceramic particles in the suspension to produce the required high density and fine grain size in the final fired layer. When ceramic powders are reduced to such small particle sizes, i.e., less than 0.5 microns, they tend to have a significant soluble portion that dissolves in an aqueous suspension thus causing chemical reactions with the dispersants and binders in solution.

Smaller particles are also more difficult to handle making automated systems unduly complex and expensive.

Barium titanate, the base material of choice for capacitor formulations dup to its dielectric characteristics, forms a soluble cation. Since the binder contains dispersing agents, any reaction of the soluble cation or its companion hydroxyl ion with the chemical dispersants in the binder can cause agglomerates of binder and "salting out" or precipitation of the metal cation-dispersant complex. These complexes or agglomerates often create voids in the ceramic body during the binder burnout phase prior to sintering and can result in either elevated levels of electrical leakage or electrical shorting paths. Void formation is particularly unforgiving in layers having a thickness of less than 10 microns.

Another problem that occurs when making suspensions with ceramic powder of less than 0.5 microns in diameter is that both the interfacial area between the solids and the liquid carrier and the number of particles in a given volume are greatly increased. This results in a high physical chemical interaction between the solid particles in the liquid phase, and diminished processability, especially at commercially acceptable solids loading levels. Hence it can be expected that the benefit of finer particle sizes can be countered by the necessity of going to lower solids loadings in the suspensions or slips. Manufacturing processes which expose the suspension to high shear conditions such as those encountered in pumping or tape casting, result in excessive gelling and in the worst case, dilatant-like conditions which are characterized by unworkable suspensions with shear thickening characteristics and high viscosities.

A variety of attempts have been made to prepare finely divided ceramic powders in aqueous suspensions and slips. For example, U.S. Pat. No. 3,496,008 discloses the ball milling of a ferroelectric material such as barium titanate in a 60% by weight solids loading level of milled material to water. The mixed suspension is rediluted to a desirable consistency for spray application.

In U.S. Pat. No. 3,551,197 a dielectric composition is prepared with between 40 to 90 weight percent of a ceramic powder in water. The ceramic powder is selected from a group including barium titanate, strontium titanate, calcium titanate, and lead titanate, and has a particle size of 0.5 to 3 micron. The suspended ceramic material is combined with a binder such as polymethylene glycol or diethylene glycol for example.

In U.S. Pat. No. 4,968,460, an aqueous emulsion of water soluble polymeric binder is combined with an aqueous suspension of ceramic material in a solids loading of at least 50 weight percent. The polymeric binder is used in a range of 0.5 to 35 weight percent and optionally with up to 5 weight percent of a selected dispersing agent. Tapes prepared from the slip composition had a thickness of between 30 microns and 2.540 mm. Particle sizes in the range of 0.5 to 12 micron are disclosed.

These references however, do not address the problems encountered in the preparation of aqueous suspensions or slips of ceramic powders having particles of less than 0.5 micron in diameter.

A suspension of ceramic powder having a diameter of 0.5 micron or less which remains suspended in an aqueous carrier fluid for extended periods of time in a substantially unagglomerated state and which maintains an apparent viscosity of less than 3000 centipoise (cps) without solidifying when determined from high shear rates of between 50 to 100/sec, would be a desirable improvement in the art of ceramic suspensions, slips, and the processes for producing them.

Yet another object of the present invention is to produce an aqueous suspension which has a ceramic powder loading of up to about 30% by volume and has an apparent viscosity of less than 3000 cps.

Yet another objective of this invention is to passivate the surface of the particle making up the ceramic powder with respect to soluble anions and cations, with a very thin layer of a relatively insoluble passivating agent, such as barium oxalate, then apply a dispersing agent to create a stable suspension. Surface passivation is necessary to prevent interactions of the barium, or other ions, which can cause cross-linking with the dispersing agent(s).

An additional objective of the invention is to enable the formation of stable slips at high solids loading of up to about 30% by volume of total solids (70 weight percent) or more of barium titanate, which have low enough viscosities to give good flow properties necessary to make thin green layers; which contain the necessary binder to form a cohesive film; and which have a uniform distribution of ceramic particles.

A further object of the present invention is to provide a slip which is non-dilatant in high shear applications such as pumping and spraying.

SUMMARY OF THE INVENTION

Accordingly, the present invention provides a method for preparing a ceramic composition by suspending a quantity of ceramic powder, having an average particle size range of 0.5 micron or less in a range of up to 30% by volume of total solids in a carrier fluid composed of water and a quantity of passivating agent ranging from 0.5 to 5% by weight of ceramic powder. A quantity of is either anionic or cationic dispersant is added to the suspended material in a range of at least 1% by weight based on the ceramic powder. The suspension and dispersing agent are then diluted with water and exhibit an apparent viscosity in the range of less than 3000 centipoise.

In an alternate embodiment, a quantity of an organic binder is added to the suspension in a range of 12 weight percent or less and preferably 3 to 12 weight percent to form a slip composition. The slip may then be applied to a substrate or mold to form a green layer having pore sizes of less than 0.5 microns.

The features and advantages of the present invention are meant to be illustrative rather than exhaustive. Further advantages and features of the present invention will become apparent while reviewing the detailed description of the invention.

DETAILED DESCRIPTION OF THE INVENTION

To form a thin dense layer of a ceramic or dielectric powder, such as $BaTiO_3$ from an aqueous suspension of the ceramic powder, it is necessary to create a stable suspension which resists settling at high solids loading; which is processable, i.e. has an apparent viscosity level which is sufficiently low to allow casting or pouring of thin films; has a Bingham yield point which provides that the applied layer of suspension achieves a gel state but which does not become dilatant; and where desired, contains an organic binder that will hold the particles together during the subsequent operations in the process prior to the ultimate high temperature sintering operation.

An additional characteristic of the present invention is to provide a very thin coating on the particles which will produce a zeta potential which weakens the inherent interparticle attraction yet which will be more hydrophobic in nature, and will aid with the organic binder to control the physical properties of the green layer.

The inventors have discovered that for the preparation of suspensions and slips containing elevated ceramic powder loading levels in aqueous carrier fluids, there exists a critical concentration range for passivating agents which will result in reduced agglomeration and more uniform pore size distributions in the green layers and green bodies made therefrom. In one embodiment, ceramic compositions for tape fabrication were prepared by uniformly suspending ceramic powder up to about 30 volume percent and more particularly from 20 to 30 volume percent in an aqueous carrier fluid of deionized water to which the passivating agent had been previously added. The term "uniform" is defined to mean pore sizes of 0.5 microns or less formed in green layers which were prepared from suspensions or slips of the present invention. Prepared suspensions had consistencies of from fluid-like to paste-like depending on the loading level of ceramic powder. The dispersant was subsequently added to the mixture to obtain a uniform suspension. While a variety of ceramic powders will be known to those skilled in the art, the powders that will benefit most from the passivation-dispersion technology are those powders that display phase instability in the presence of water or those powders with relatively high solubilities or leachability of at least one of the metal components of the ceramic powder between $10^{-1}$ M to $10^{-1}$ in a pH range of 4 to about 11. Furthermore, powders with an average particle size of 0.5 micron or less and preferably between 0.05 micron and 0.5 micron (and having at least one metal component in the solubility or leachability range noted above) will benefit most from the passivation-dispersion technology disclosed herein.

There are a number of methods for measuring average particle size of ceramic powders that are widely known to those skilled in the art. In the present invention, average particle size was determined by BET gas adsorption surface area analysis. This method is particularly useful in calculating average particle size when the powder particles are substantially spherical as is the case of the powders used in the present invention.

The term ceramic powders are further defined to include metallic oxides such as zinc oxide, bismuth oxide, or aluminum oxide; metallic sulfides, metallic borides, metallic nitrides, metallic carbides, metallic tellurides, metallic arsenides, metallic silicides, metallic selenides, and metallic halides; and including mixed materials such as metallic titanates, metallic tantalates, metallic zirconates, metallic silicates, metallic germanates, and metallic niobates.

The metal component of the metallic oxides may include those metals of the periodic table of elements found in groups IIA through IIB, and also including the Lanthanum and Actinium series.

Ceramic powders are further defined to include complex oxides having the general formula $ABO_3$ wherein A consists of one or more of the metallic species which are of a similar ionic radius and ionic charge and are selected from the group consisting of barium, calcium, magnesium, lead, strontium, and zinc. Group B consists of one or more metallic species selected from the group consisting of hafnium, tin, titanium, zirconium, and may further include mixtures or solid solutions thereof. Those skilled in the art will recognize the similarity of the cited B species with titanate based on reported values for ionic radius and ionic charge.

In an alternate embodiment, ceramic powders are further defined to include the above identified complex oxides having the general formula $ABO_3$, and may also contain one or more dopants. As the quantity of dopants to be added is normally a small weight percent of the total solids, the addition of a dopant generally does not affect the physical characteristics of the slip or suspension. Those skilled in the art will therefore recognize that a variety of "dopants" may be used. The term "dopants" shall be defined to include an additive which is used to tailor the electrical performance of the ceramic powder in the finished capacitor. In the present invention, dopants may be defined to include one or more metals selected from the oxides of the group consisting of aluminum, antimony, bismuth, boron, calcium, cadmium, chromium, copper, cobalt, hafnium, iron, lanthanum, lead, manganese, molybdenum, neodymium, nickel, niobium, praseodymium, samarium, scandium, silicon, silver, tantalum, titanium, tin, tungsten, vanadium, yttrium, zinc, and zirconium.

The passivating agent can be any acid or base which (i) burns out cleanly from the suspension or slip at a temperature of about 1050° C. or less, (ii) provides a uniform surface charge on the ceramic particles as a function of the carrier fluid pH, (iii) has reasonably flat solubility over a pH range of 4 to about 11, (iv) forms relatively insoluble precipitates with at least 1 metallic species of the ceramic powder, (v) promotes adsorption of desired anionic or cationic dispersants, and (vi) after adsorption of the dispersant, has "improved settling characteristics", defined hereafter to mean a sol which remains opaque for a period of one week without appreciable precipitation when compared to control samples prepared in an aqueous carrier, at the same solids loading but without a passivating agent. Analytical methods for determining the opacity of the sol are known to those skilled in the art and will not be elaborated upon herein.

While a number of passivating agents will be known to those skilled in the art, particularly desirable agents may include compounds or mixtures of succinates, benzoates, formates, cupferons, and 8-hydroxyquinoline. Although not wishing to be so limited, oxalic acid is the preferred passivating agent as discussed and evaluated in the Examples presented below. Preferably the oxalic acid is dissolved in deionized water at 1 to 3% by weight of ceramic powder.

The inventors have also discovered that for a ceramic powder loading level of up to 30 volume percent, an optimum passivating agent loading level of 1 to 3 weight percent exists for a quantity of dispersing agent of greater than or equal to 1 weight percent. At lower concentrations of passivating agent, the ceramic powder begins to form agglomerates. At higher concentrations, the excess passivating agent in the carrier fluid forms precipitates with dilute metals and dispersants and apparent viscosity increases to unacceptably high levels, i.e. to greater than 3000 centipoise as determined at 50 to 100/s. The term "apparent viscosity" is known to those skilled in the art and shall be defined hereafter to mean a value determined by fitting a power function to a viscosity-shear rate curve which is prepared from actual viscosity measurements. The resulting function is used to calculate the viscosity at shear rates of 50 $\sec^{-1}$ and 100 $\sec^{-1}$. A point-slope method is then used to extrapolate to zero shear rate using the linear fit to the viscosity-shear rate curves to determine the apparent viscosity.

The present invention contemplates that dispersant concentrations of greater than 5% by weight may be used depending on the passivating agent and binder selected for a given slip composition.

While not wishing to be so limited, dispersing agents preferably include the characteristics of being polymers which are; (i) compatible with a ceramic powder particle passivated in the manner discussed above and which uniformly coat the particle; (ii) which have trains which stretch in a generally parallel manner across the particle surface rather than extending radially therefrom; (iii) which minimize crosslinking or "salting out" in the bulk suspension solution; and (vi) and which have a zeta potential in excess of +10 millivolts and preferably either in the range of +10 millivolts to about +40 millivolts or of −10 millivolts to about −40 millivolts for the loading levels discussed above. A zeta potential magnitude which is less than ±10 millivolts results in a suspension where there is insufficient electrostatic repulsion to prevent particle agglomeration.

Various anionic and cationic surfactants having molecular weight in the range from less than 1000 to greater than 30,000 are contemplated as dispersants. Included are sodium, potassium, or preferably ammonia salts of stearate, lauryl sulfate, alkyl polyphosphate, dodecyl benzene sulfonate, disopropylnaphthalene sulfonate, dioctylsulfosuccinate, ethoxylated and sulfated lauryl alcohol, and ethoxylated and sulfated alkyl phenol.

Various cationic surfactants include polyethyleneimine, ethoxylated fatty amine and stearylbenzyldimethylammonium chloride or nitrate. Alternate dispersants contemplated in the present invention include: polyethylene glycols, lecithin, polyvinyl pyrrolidone, polyoxyethylene, isoctylphenyl ether, polyoxyethylene nonylphenyl ether, amine salts of alkylaryl sulfonates, polyacrylate and related salts, polymethacrylate and related salts, and fish oil. Additional anionic and cationic dispersants having the characteristics described above may be found in the reference entitled McCutcheon's, Volumes 1 and 2, McCutcheon Division, published by The Manufacturing Confectioner Publishing Co.

In operation, up to 30 volume percent of a ceramic powder was suspended in an aqueous carrier fluid containing from 0.5 to 5 weight percent of passivating agent. A quantity of dispersing agent of greater than or equal to 1% by weight of the ceramic powder was then added to the passivating agent containing carrier fluid. An additional quantity of water was then introduced to achieve the stated weight percent loading level.

A final suspension pH of between about 4 and about 11 and preferably between 7 and 10 was achieved. Suspensions prepared by this method had Bingham yield points of less than 230 dynes/$cm^2$ and apparent viscosities of less than 3000 cps.

The inventors have discovered that the step of adding passivating agent to the carrier fluid prior to the addition of the ceramic powder is critical to the performance of the suspension or slip as a green layer. While not wishing to be limited to any specific theory, it is considered that the dissolution reactions at the powder surface occur rapidly which requires the passivating agent to be available upon introduction of the particles into the carrier media. If the passivating agent is added after the powder is introduced, the precipitation very likely occurs in the bulk solution rather than at the particle surface.

In an alternate embodiment, a quantity of dispersant may be added directly to the carrier fluid with the passivating agent prior to the addition of the ceramic powder.

In a method for producing a slip of the ceramic powder, a quantity of organic binder of 12% or less was added to the suspension prepared according to the process discussed above and diluted further with water.

The criteria for selecting a binder are that the binder must uniformly disperse throughout the suspension and bind the passivated or dispersant coated ceramic particle while minimizing separation of phases. The uniform distribution of passivated particles facilitates particle coating by the binder thereby allowing less binder to be used. Although not wishing to be so limited, polyethylene glycol, commercially available under the trademark "Carbowax®" was utilized. Carbowax is a trademark of Union Carbide of Danbury, Conn. In another embodiment, polyvinylpyrrolidone was used as a binder at 12% loading levels by weight of the ceramic material. In yet another embodiment a total of 13% of polyethyleneimine was used as a combined dispersant and binder.

Slip materials prepared at the loading levels discussed above were then applied on a substrate by methods known in the art to form green layers having a thickness of 5 microns or less.

By sandwiching conductive layers between multiple green layers, green bodies may be prepared. Those skilled in the art will be familiar with the techniques for preparing green bodies and therefore such techniques will not be further discussed.

Figure 1B:
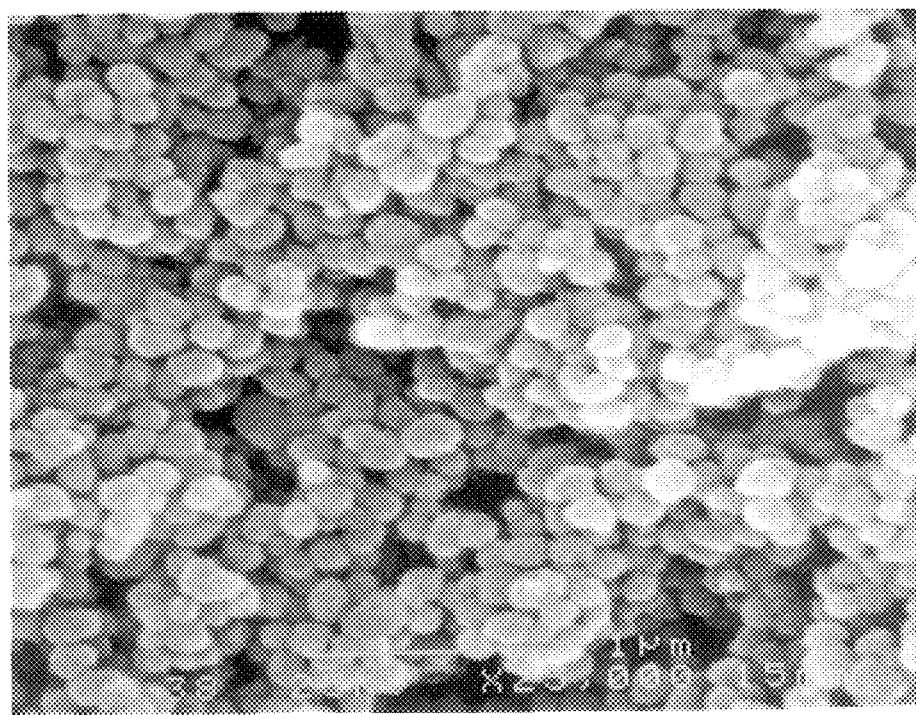
Figure 2A:
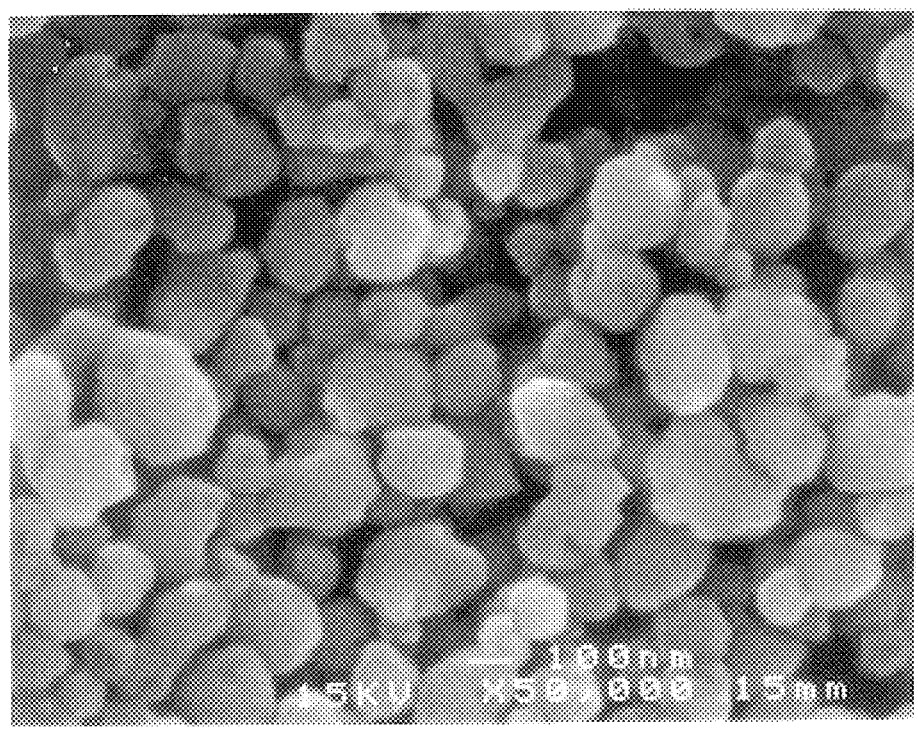
Figure 2B:
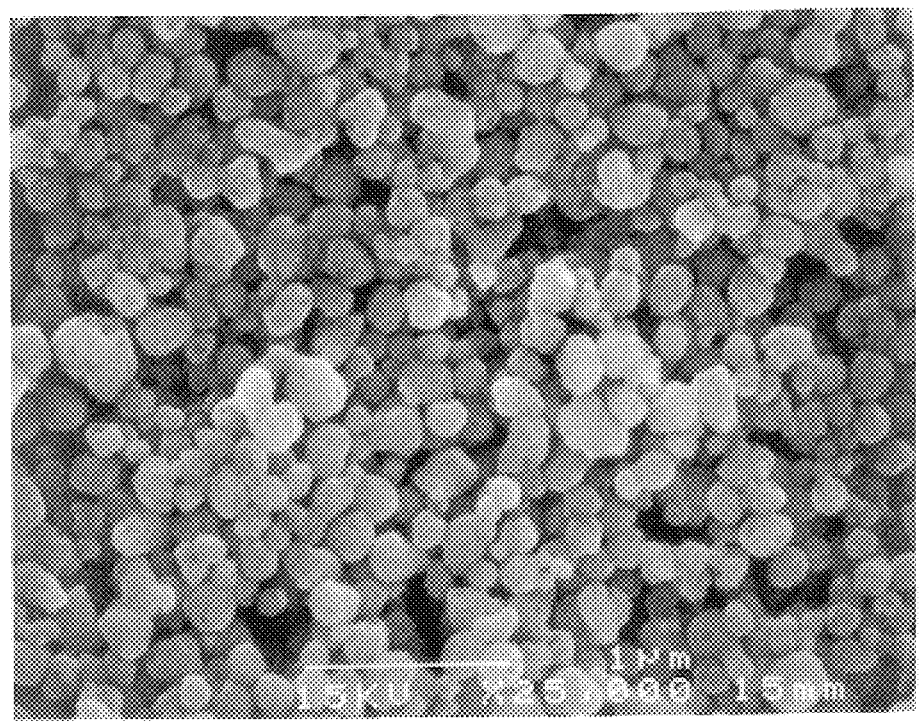
Figure 3A:
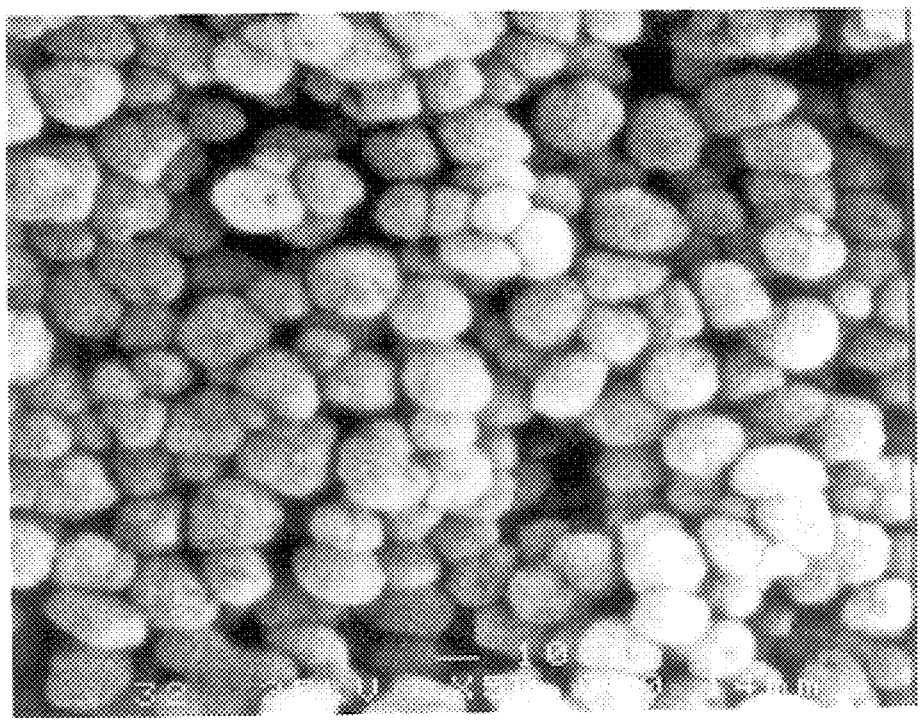
Figure 3B:
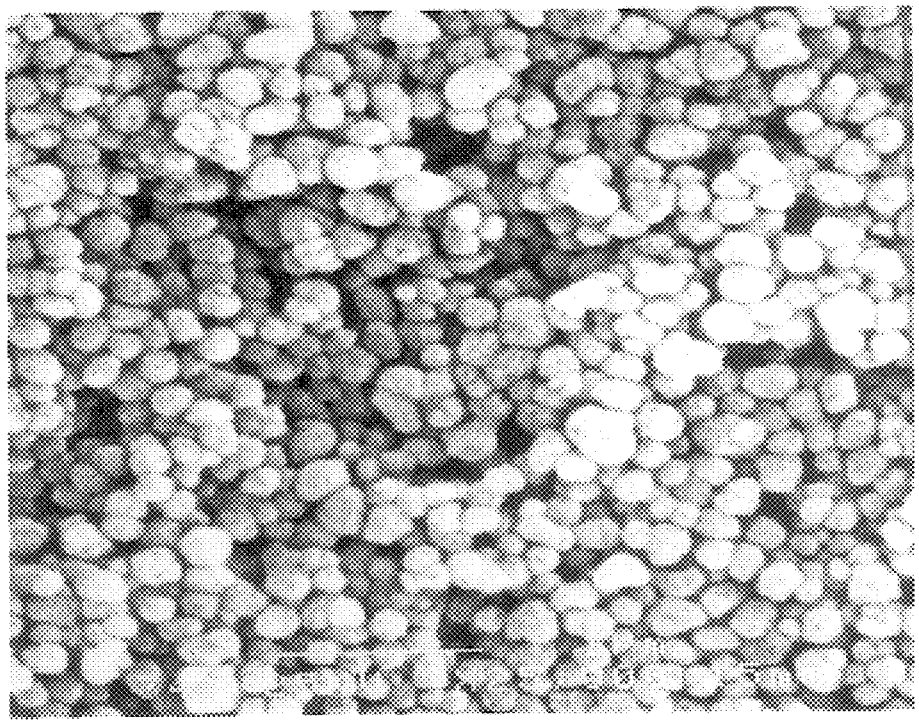
Figure 4A:
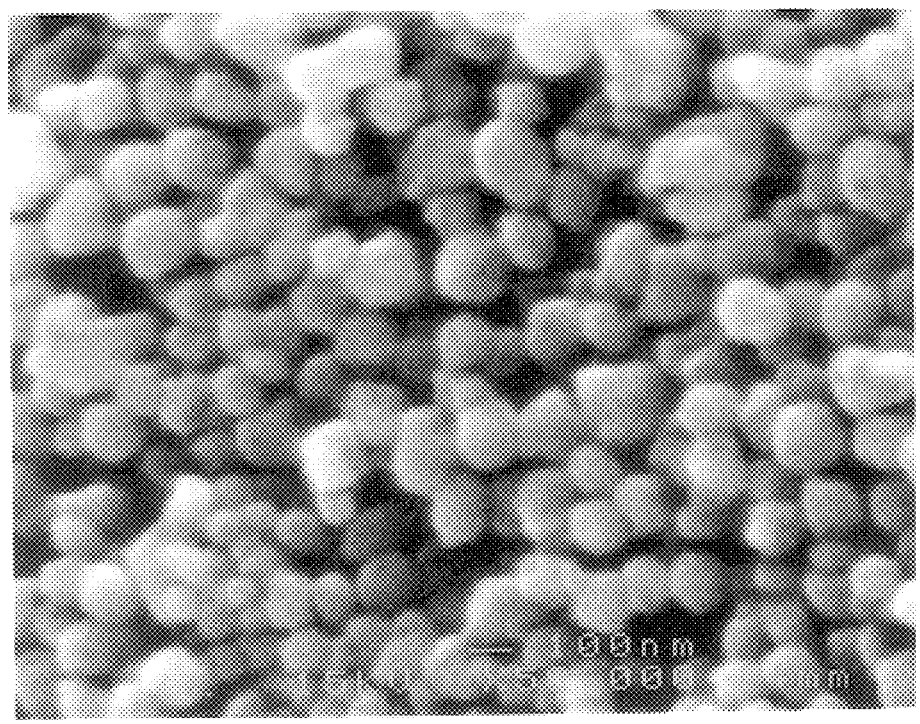
Figure 4B:
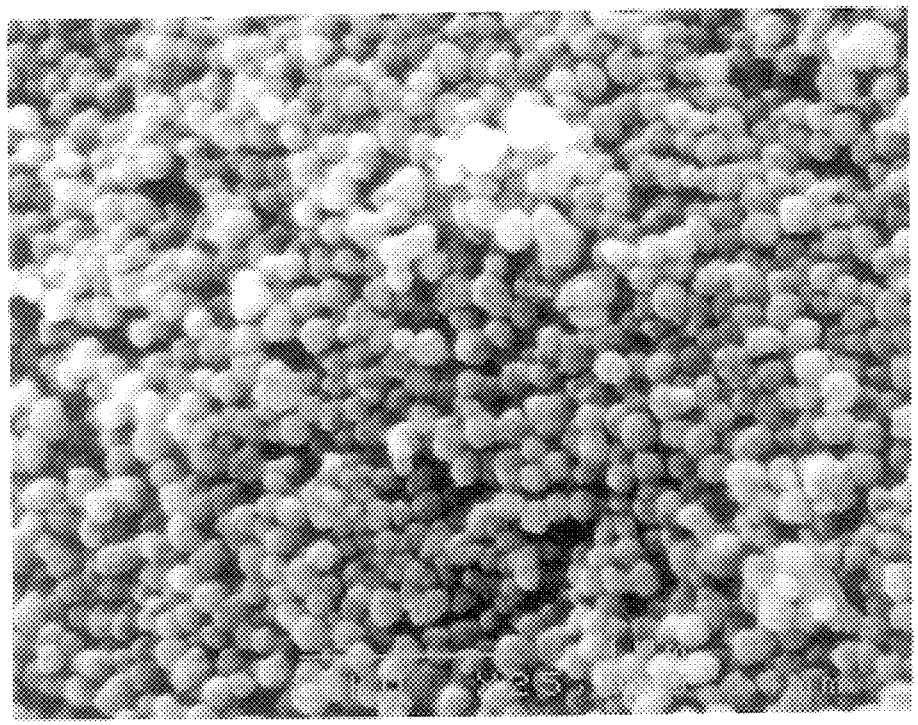
Figure 5A:
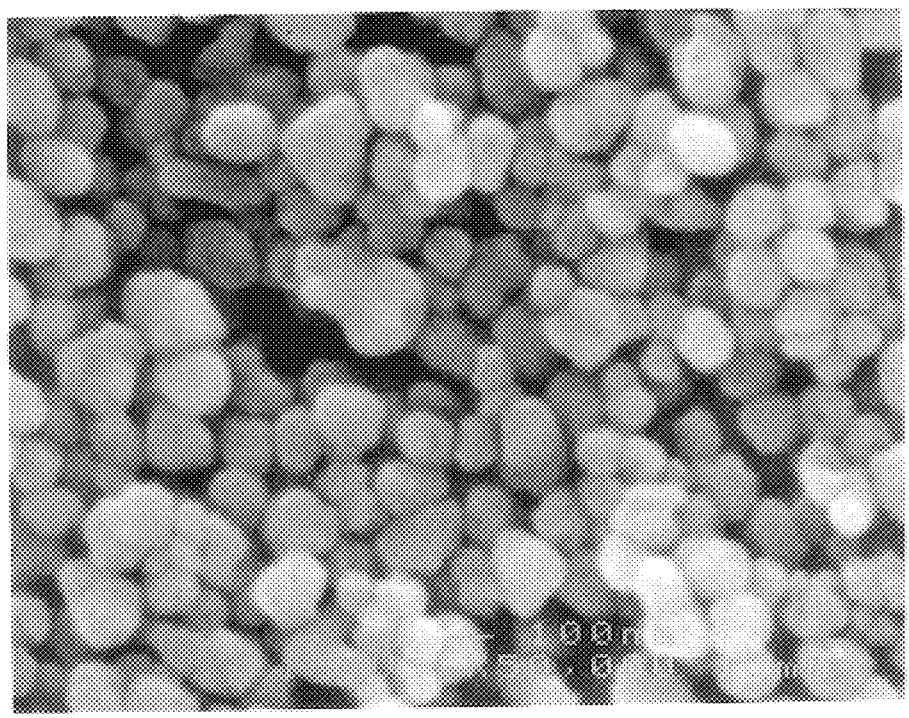
Figure 5B:
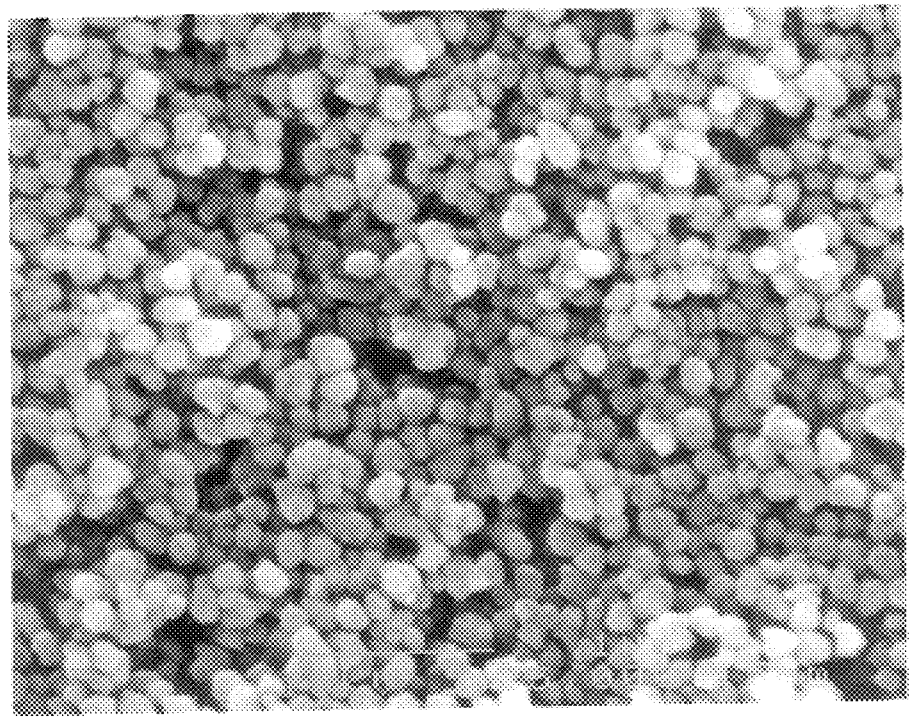
Figure 6A:
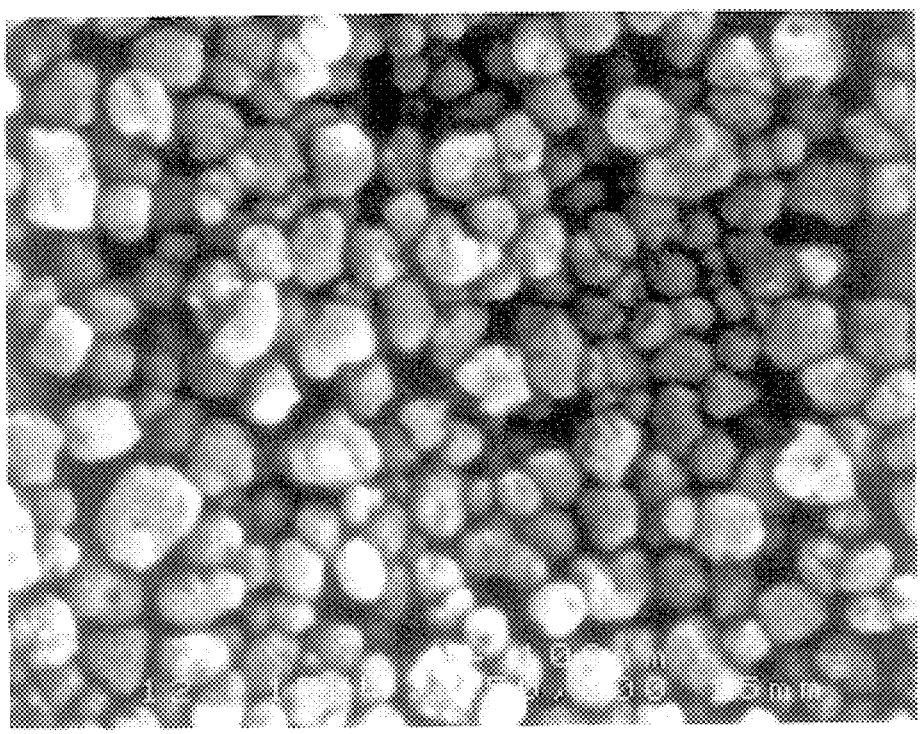
Figure 6B:
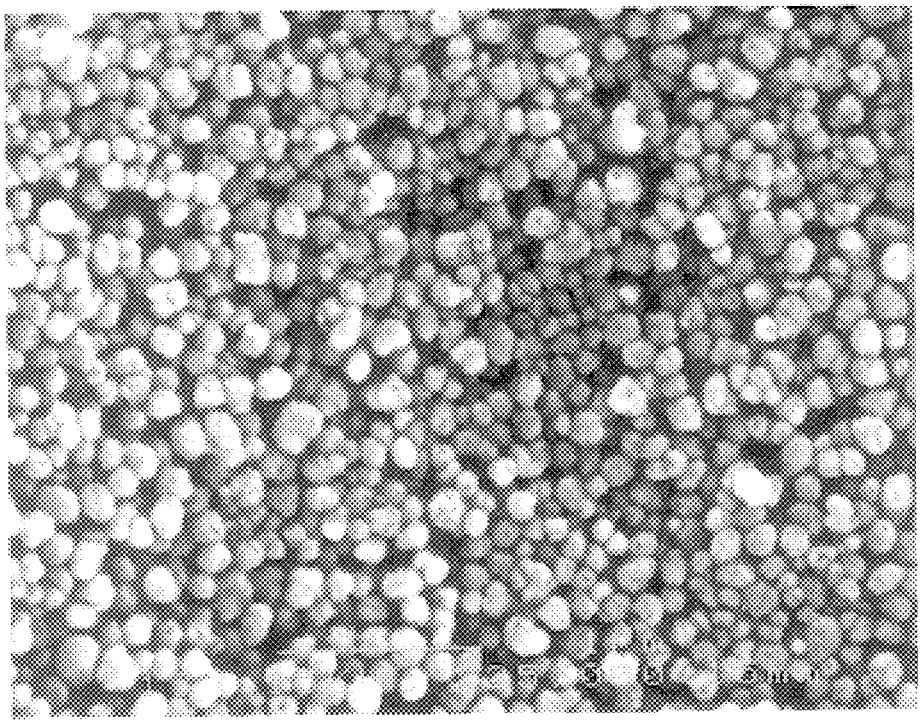
Figure 7A:
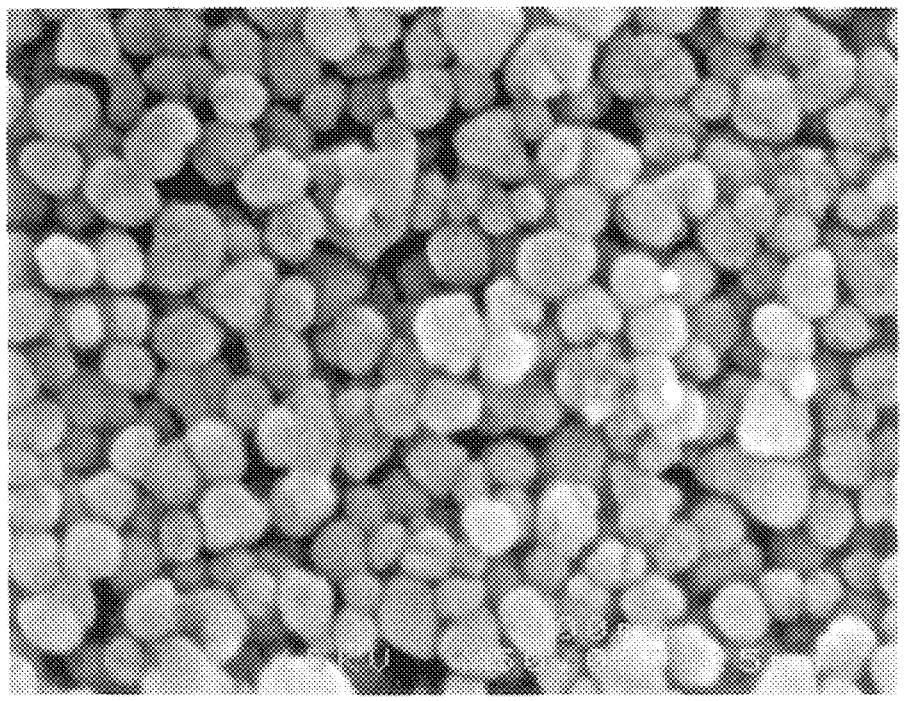
Figure 7B:
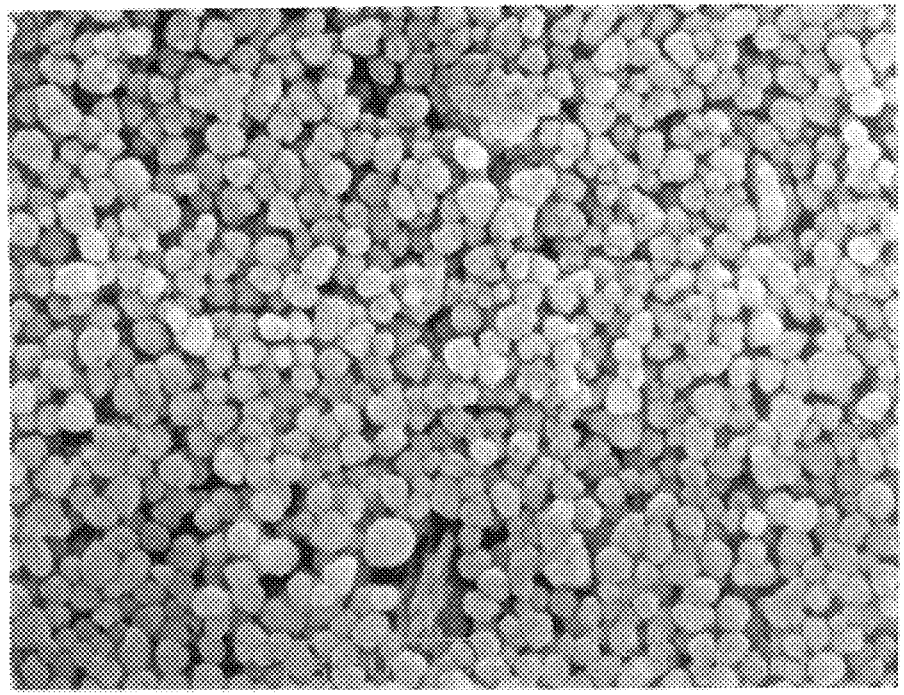
Figure 8A:
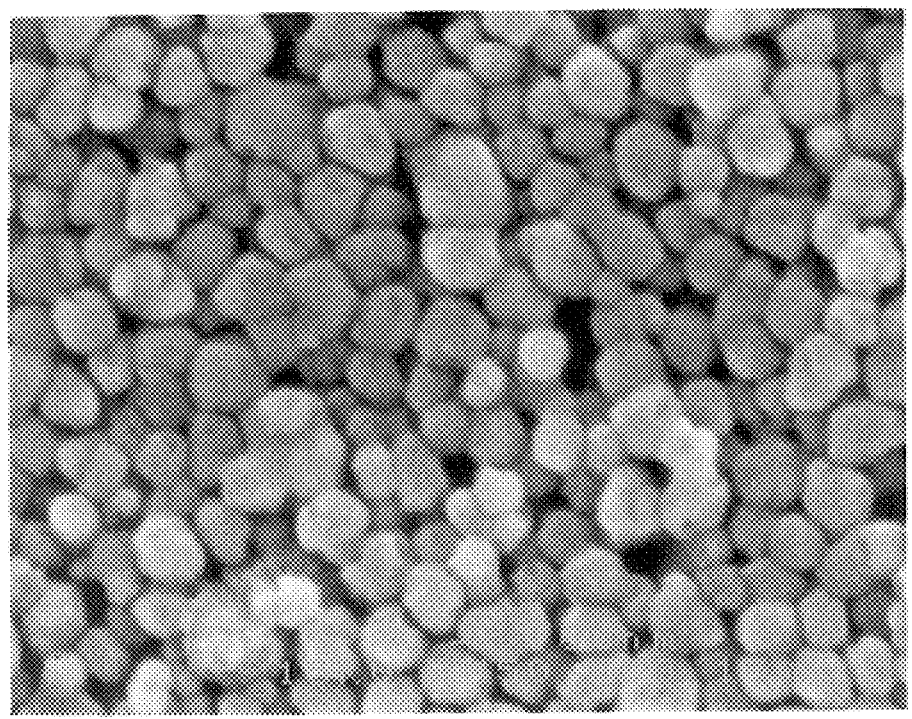
Figure 8B:
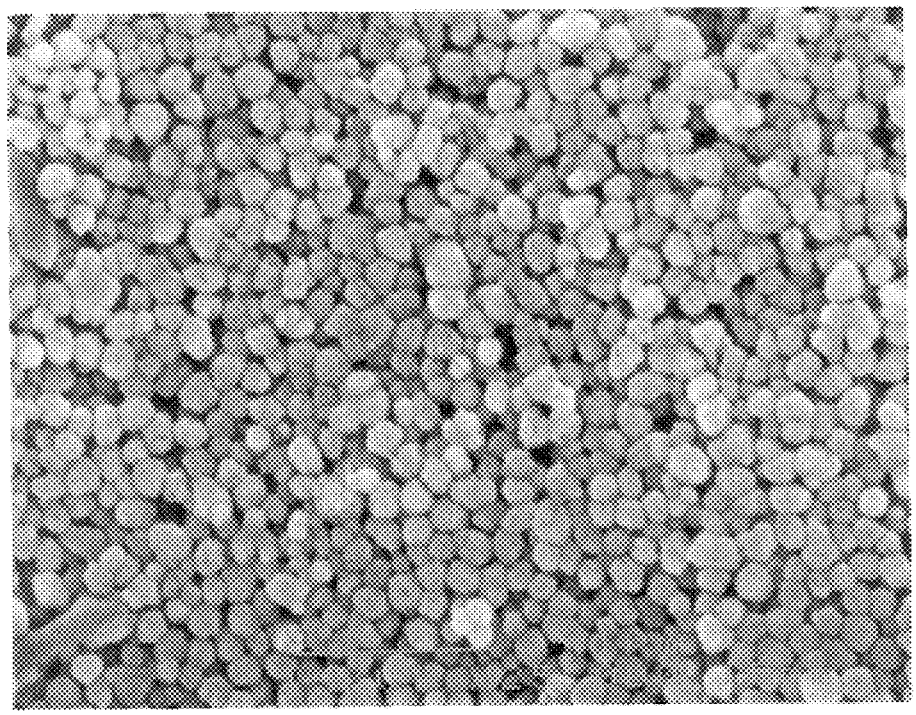
Figure 9A:
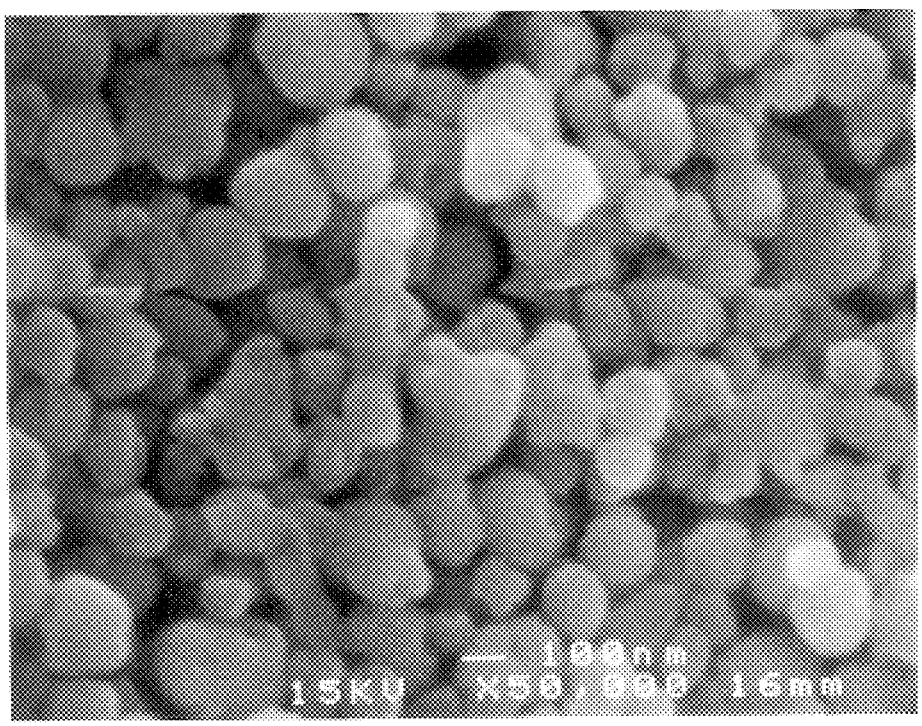
Figure 9B:
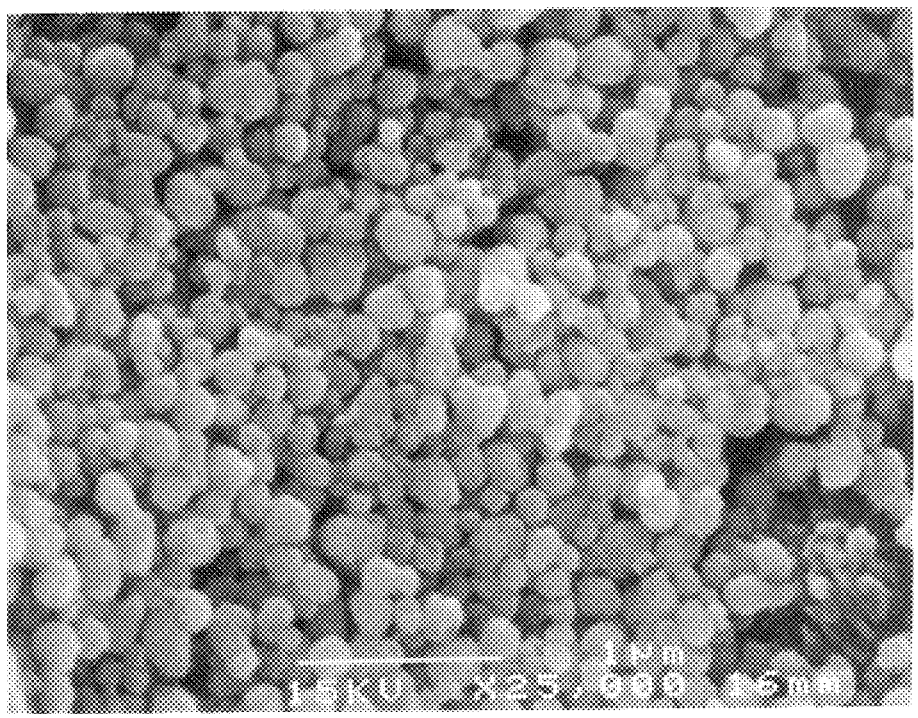

Referring to FIGS. 1A and B. scanning electron photo micrographs made from suspensions prepared in accordance with Example 1, are illustrated at two different magnifications. Loading rates of 0.5 weight percent of oxalic acid and 1 weight percent polyethyleneimine were used. As illustrated, agglomerated areas are clearly visible. Considerable improvement in the degree of agglomeration is seen in the micrographs of FIGS. 2 and 3, A and B, where green layers were prepared in accordance with the procedures of Examples 2 and 3. Loading rates of 0.5 weight percent oxalic acid at 5 weight percent of polyethyleneimine and 1 weight percent oxalic acid and 1 weight percent of polyethyleneimine, were used. FIGS. 4A and B are micrographs of cast green layers prepared in accordance with Example 5 where 1 weight percent of passivating agent and 3 weight percent of polyethyleneimine were used. When the amount of polyethyleneimine was increased to 5 weight percent, green layers illustrated in FIGS. 6A and B were obtained which are similar to FIG. 5. Where levels of oxalic acid from 2 to 3% were used and levels of polyethyleneimine from 1 to 5%, were used (FIGS. 7 to 9), commercially acceptable green layers were obtained. However, the micrographs of FIG. 1, illustrate that where oxalic acid loading levels of 0.5 weight percent were used at solids loading up to 30% by volume, and 1 weight percent of polyethyleneimine was used, excessive agglomeration and unworkable viscosity was obtained. The micrographs demonstrate the criticality of the lower range of passivating loading for aqueous suspensions. While not wishing to be bound by any particular theory, one explanation is that the passivating effect of the oxalic acid is insufficient at 0.5 weight percent to passivate the barium titanate at the indicated level of solids loading.

Figure 10A:
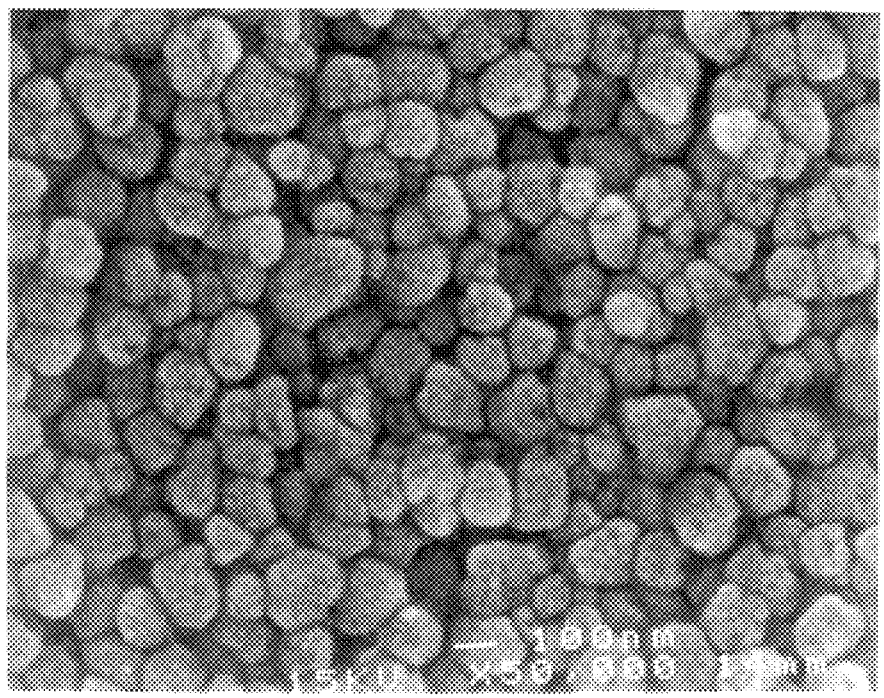
Figure 10B:
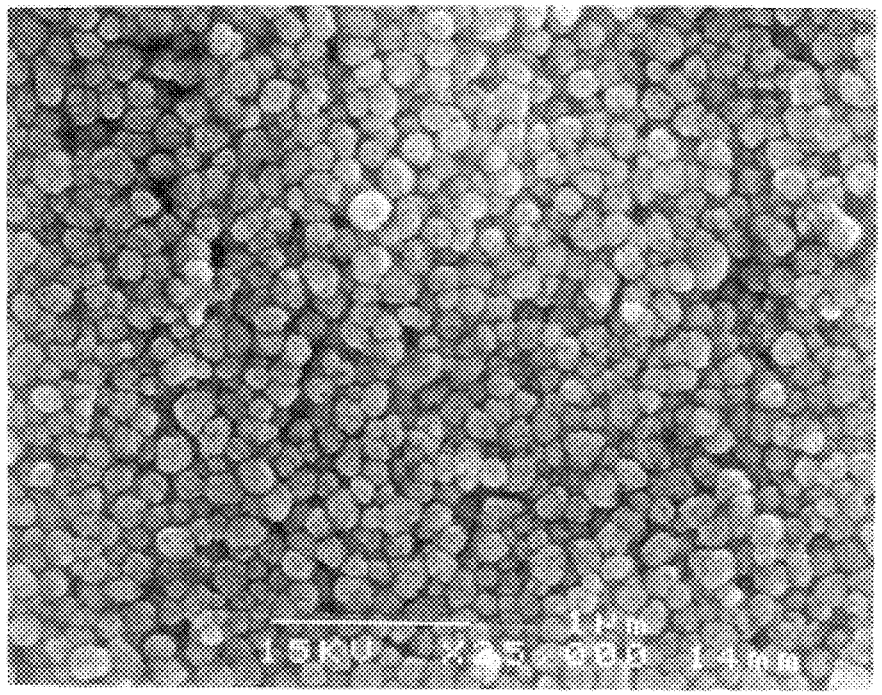

Referring now to FIG. 10, aqueous slips were prepared in accordance with the procedure described in Examples 16 and 17 where 3 weight percent of oxalic acid and 1 weight percent of polyethyleneimine were combined with 3 weight percent of polyethylene glycol binder. The micrographs illustrated in FIGS. 10A and B show that the surface of the green layer has a uniform pore size distribution of 0.5 micron or less.

Figure 11A:
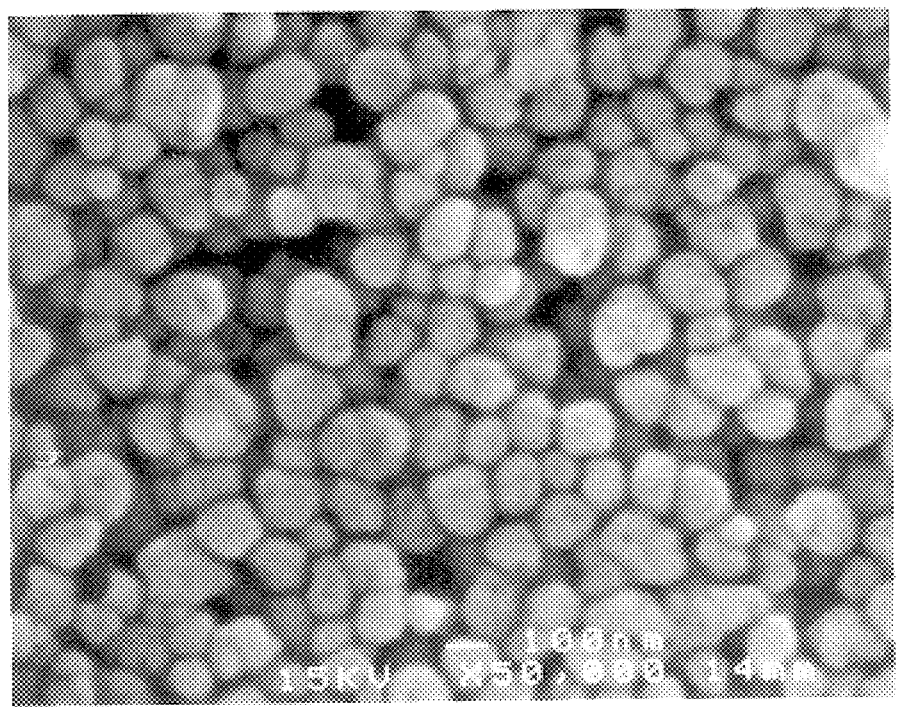
Figure 11B:
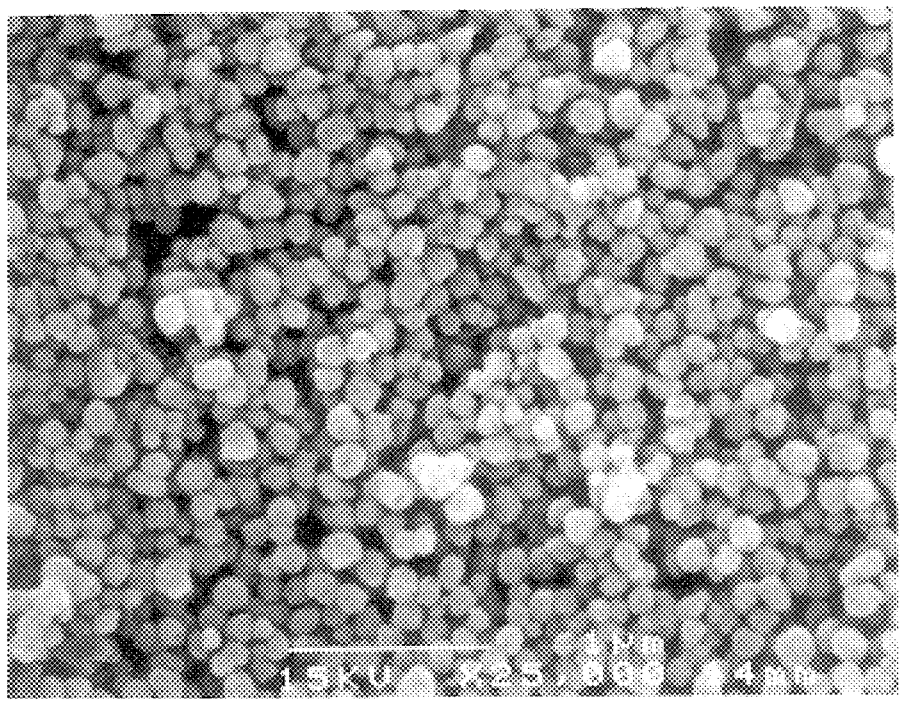

In FIG. 11, an aqueous slip was prepared in accordance with the procedure described in Example 18 where 3 weight percent of oxalic acid, 1 weight percent of polyethyleneimine was combined with 6 weight percent of polyethylene glycol binder. Commercially acceptable green layers were obtained having a pore sizes 0.5 micron or less.

Figure 12A:
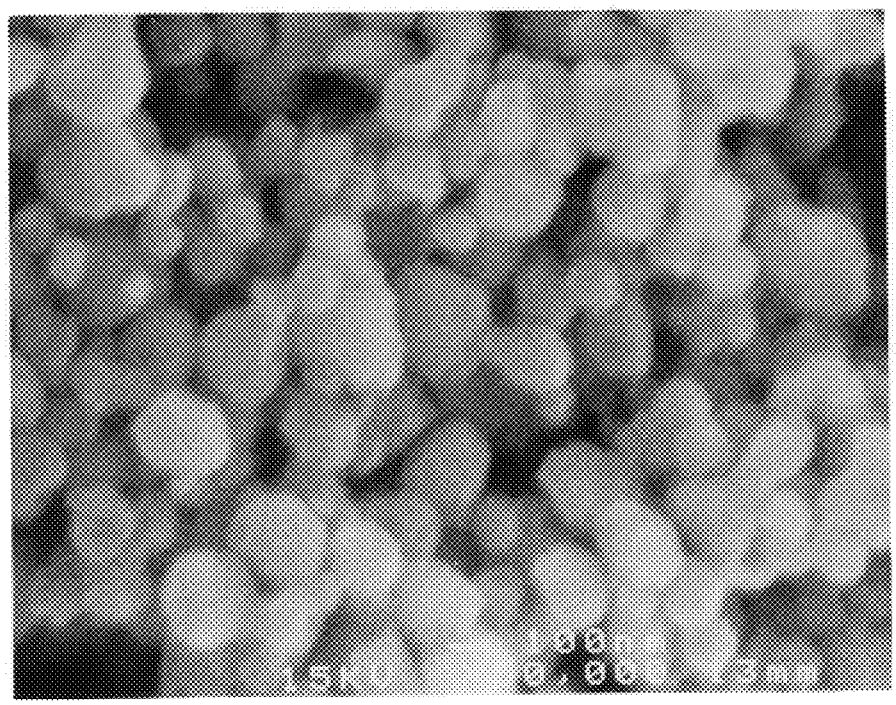
Figure 12B:
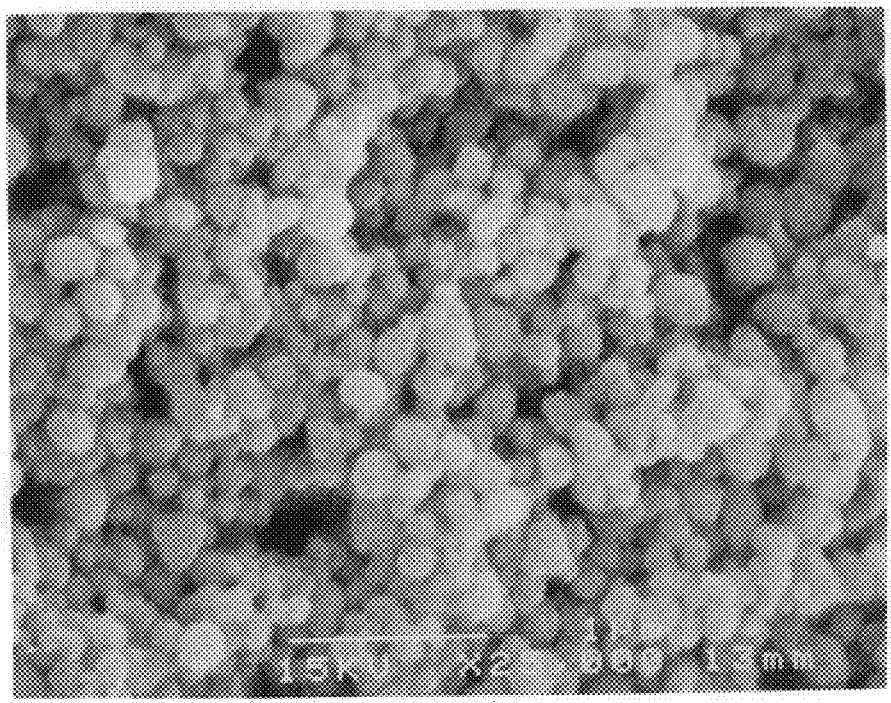

In FIG. 12, an aqueous slip was prepared in accordance with the procedure described in Example 19 where 3 weight percent of oxalic acid, 1 weight percent of polyethyleneimine was combined with 12 weight percent of polyvinyl pyrroilidone binder. Commercially acceptable green layers were obtained having a pore size of less than 0.5 micron.

Figure 13A:
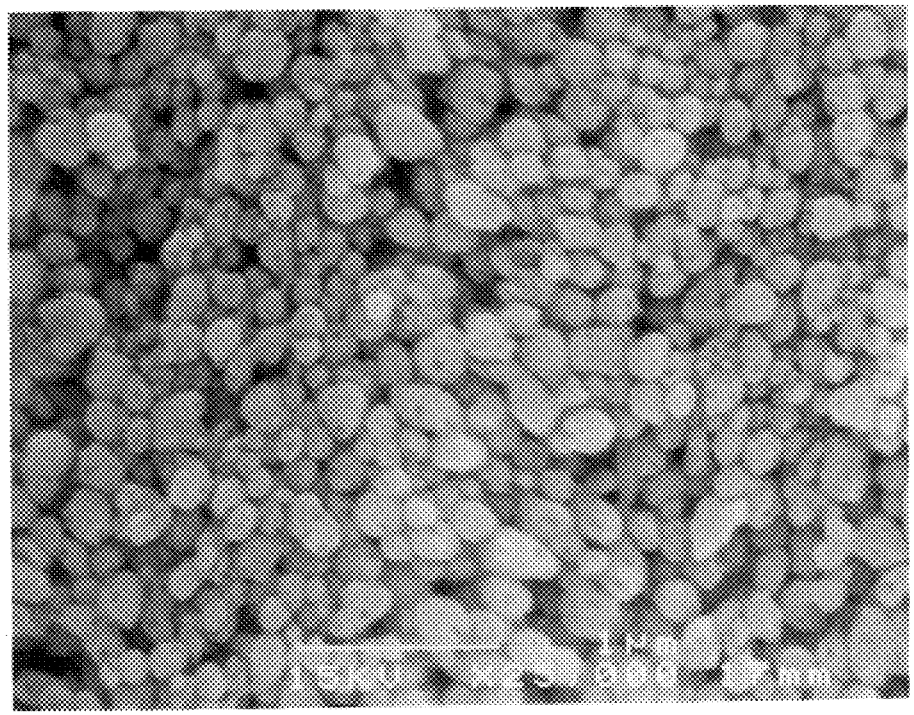
Figure 13B:
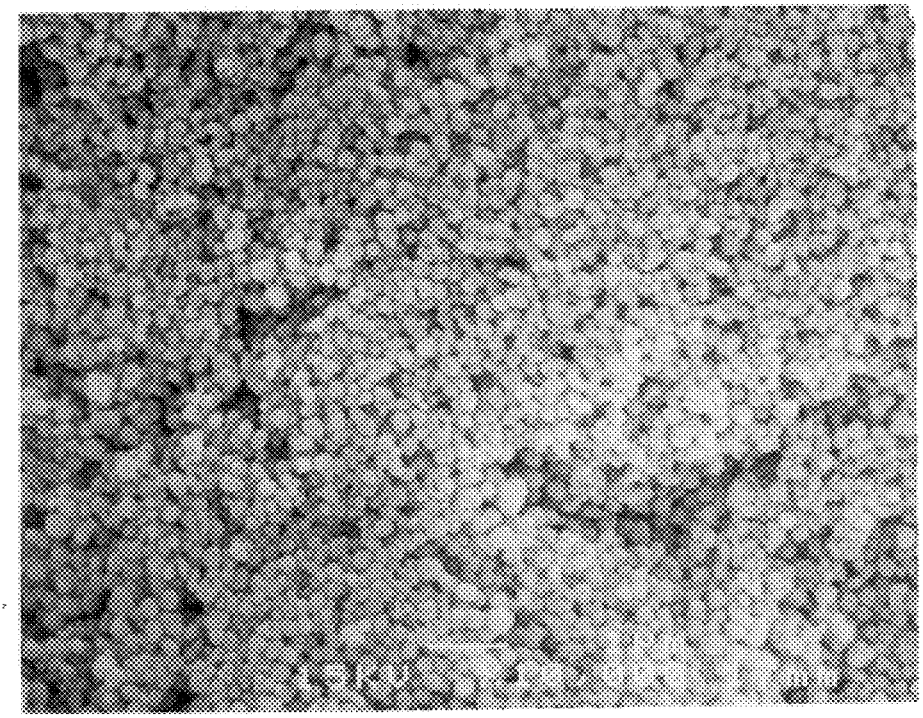

In FIG. 13, an aqueous slip was prepared in accordance with the procedure described in Example 20 where 3 weight percent of oxalic acid and 2 weight percent of polyethyleneimine was combined with 11 weight percent of polyvinyl pyrroilidone binder. An apparent viscosity of 1050 cps was obtained.

Figure 14A:
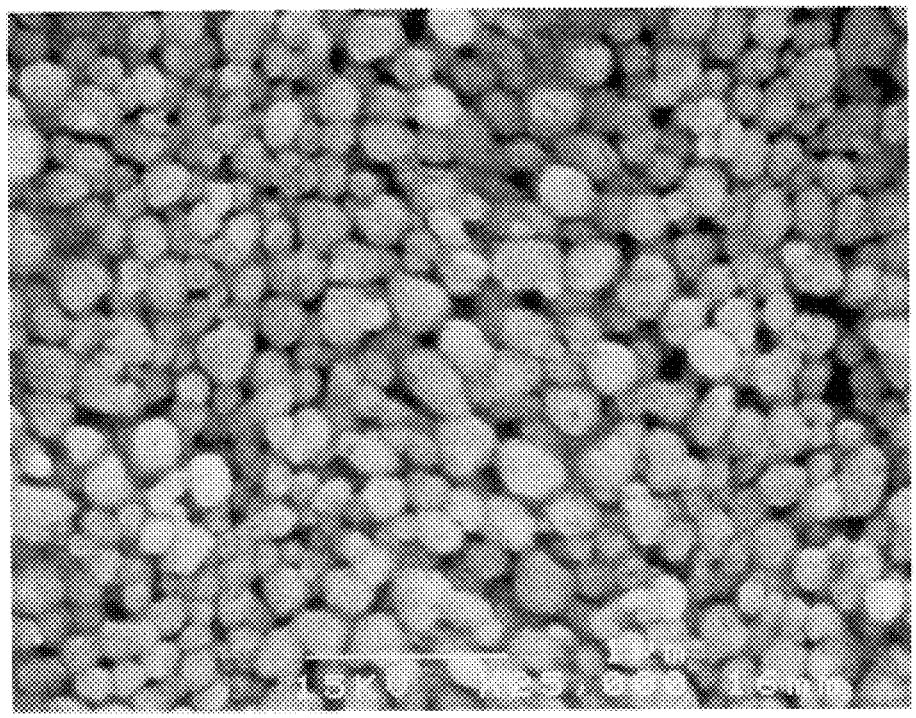
Figure 14B:
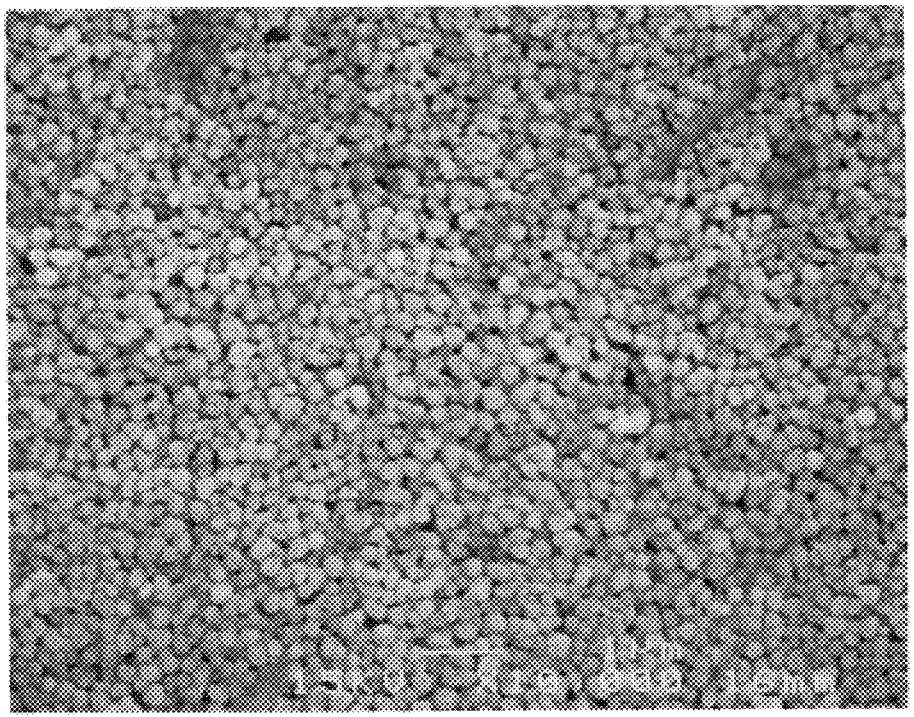

In FIG. 14, an aqueous slip was prepared in accordance with the procedure described in Example 21 where 3 weight percent of oxalic acid and 1 weight percent of polyethyleneimine was added as a dispersant. An additional 12 weight percent of polyethyleneimine was added as the binder. An apparent viscosity of 779 cps was obtained. The green layer formed had a pore size of 0.5 micron or less.

The present invention will become more readily understood by the following non-limiting Examples. Apparent viscosity and loading levels for Examples 1–21 are summarized in Table 1 hereunder. Percentages are in weight percent of ceramic powder unless otherwise designated.

EXAMPLE 1

An aqueous solution of oxalic acid was prepared with 0.2810 g oxalic acid (as $H_2C_2O_4 \cdot 2H_2O$) and 23.2 g $H_2O$. To the oxalic acid solution 56.8068 g of barium titanate, BT-10, produced by the assignee of the present invention, Cabot Corporation, having an average particle size of about 0.1 micron was slowly added with high shear mixing (normally 5000 rpm). About 1.1433 g of polyethyleneimine or "PEI", made by Kodak, 50% in water is added to the oxalic acid/barium titanate suspension at the same mixing shear rate as above. The final suspension contained 0.5% oxalic acid and 1% PEI. The suspension obtained had an unacceptably high apparent viscosity in excess of 3000 cps and was therefore unsuitable for the preparation of green ceramic layers by wet lay-down techniques.

Actual viscosity measurements were performed on the suspensions at 250° C. using a cone-plate viscometer at shear rates ranging from 0.6 to 120 sec$^{-1}$. If the measured viscosity of the suspensions was beyond the range permitted by the measuring head of the viscometer or if insufficient data points were obtained to observe a plateau regime for the viscosity-shear rate plot, the suspension viscosity was reported as "NA". The cone plate viscometer was a Digital Viscometer, either model # LVTDCP or model DV-III Rheometer made by Brookfield Engineering Laboratory, Inc. of Stoughton, Massachusetts.

All suspensions for which Theological data could be obtained were pseudoplastic. Many of the suspensions also exhibited a Bingham yield stress, below which the slurry did not flow. This latter property is desirable for most tape or layer forming processes to ensure that the slurry does not flow off of the substrate after deposition. Suspensions which were undergoing actual viscosity measurements were evaluated also for Bingham yield by recording the shear stress at a point where the suspension or slurries tested exhibited no flow using a minimum shear rate equal to 0.6 sec$^{-1}$.

Zeta Potential Test Procedure

A quantity of suspension or slip prepared in accordance with the Examples was measured for zeta potential on a Brookhaven ZetaPlus, produced by Brookhaven Instruments Corporation, in Holtsville, N.Y.

Preparation of Green Layers

Green layers of the suspension or slip were prepared by the following method:

About 2–3cc of the suspension or slip was added onto a glass side and manually dispersed by means of running a metal blade run over the material to obtain uniform thickness. In another method, a manually operated doctor blade was run over the deposited suspension and slip materials. The suspension was then dried for 10 to 15 minutes at room temperature to form the green layer.

EXAMPLES 2–15

Were prepared in accordance with the procedure of EXAMPLE 1 employing the quantities of reactants as indicated in Table 1. Percent by weight of oxalic acid as passivating agent and polyethyleneimine as dispersant obtained in the final suspension, as well as apparent viscosity values are presented in Table 1.

EXAMPLE 17–21

Were prepared in accordance with the procedure of EXAMPLE 16 employing the quantities of reactants as indicated in Table 1. Percent by weight of oxalic acid as passivating agent and dispersant obtained in the final suspension, as well as apparent viscosity values are presented in Table 1. The dispersant utilized in EXAMPLE 19 and EXAMPLE 20 was polyvinyl pyrroilidone, available from GAF Corporation of Wayne, New Jersey as PVP K-30. In EXAMPLE 21, polyethyleneimine at a concentration of 1 weight percent was used as the dispersant and 12 weight percent was used as a binder. Green layers were produced by the doctor blade procedure presented in Example 16. As is evident from Table 1, both apparent viscosity and Bingham Yield Point values are in acceptable ranges for commercial applications.

TABLE 1

Effect of Composition on Viscosity

| Test # | Water (g) | Oxalic Acid (g) | B-10 (g) | PET (50%) (g) | Add Water (g) | Binder (g) | % Solids by Wt. | % Solids by Vol. | Apparent Viscosity (cP) | Bingham Yield Point (Dynes/cm$^2$) |
|---|---|---|---|---|---|---|---|---|---|---|
| 1 | 23.2 | 0.2810 (.5%) | 56.8068 | 1.1437 (1%) | 2.2074 | | 67.92 | 26.02 | > > | — |
| 2 | 25.33 | 0.2870 (.5%) | 56.8021 | 5.6799 (5%) | | | 64.5 | 23.2 | 1225 | 82 |
| 3 | 23.2 | 0.5682 (1%) | 56.8045 | 1.1410 (1%) | 2.1595 | | 67.72 | 26.26 | 351 | 23 |
| 4 | 23.2 | 0.5705 (1%) | 56.8041 | 2.2712 (2%) | 2.1890 | | 66.80 | 25.43 | 911 | 57 |
| 5 | 23.2 | 0.5703 (1%) | 56.8045 | 3.4040 (3%) | 2.1592 | | 65.94 | 24.34 | 505 | 27 |
| 6 | 23.2 | 0.5675 (1%) | 56.8077 | 5.6835 (5%) | 2.1107 | | 64.28 | 23.34 | 604 | 229 |
| 7 | 23.2 | 1.1372 (2%) | 56.8046 | 1.1491 (1%) | 2.1757 | | 67.25 | 26.24 | 346 | 36 |
| 8 | 23.2 | 1.1310 (2%) | 56.8048 | 2.2728 (2%) | 2.1570 | | 66.38 | 25.45 | 184 | 4.1 |
| 9 | 23.2 | 1.1350 (2%) | 56.8096 | 3.4051 (3%) | 2.1735 | | 65.50 | 24.69 | 257 | 7.1 |
| 10 | 23.2 | 1.1358 (2%) | 56.8073 | 5.6989 (5%) | 2.1984 | | 63.70 | 23.28 | 596 | 25 |
| 11 | 23.2 | 1.7036 (3%) | 56.8032 | 1.1565 (1%) | 2.1595 | | 66.81 | 25.05 | 72 | 2.8 |
| 12 | 23.2 | 1.7087 (3%) | 56.8017 | 2.2697 (2%) | 2.1917 | | 63.92 | 25.43 | 397 | 17 |
| 13 | 23.2 | 1.7043 (3%) | 56.8010 | 3.4078 (3%) | 2.1706 | | 65.07 | 24.69 | 471 | 17 |
| 14 | 23.2 | 1.7089 (3%) | 56.8064 | 5.6793 (5%) | 2.1634 | | 63.43 | 23.31 | 826 | 33 |
| 15 | 25.3479 | 2.8447 (5%) | 56.8069 | 5.6883 (5%) | | | 62.6 | 22.8 | 144 | 15 |
| 16 | 20.0468 | 1.7068 (3%) | 56.8370 | 1.1349 (1%) | 0.4335 | 1.6778 (3% PEG) | 69.82 | 28.63 | 428 | 38 |
| 17 | 20.0028 | 1.7005 (3%) | 56.8021 | 1.1307 (1%) | 0.4319 | 1.6602 (3% PEG) | 69.87 | 28.68 | 412 | 34 |
| 18 | 20.0111 | 1.7017 (3%) | 56.8039 | 1.1326 (1%) | 0.8986 | 3.3092 (6% PEG) | 68.47 | 27.30 | 602 | 13 |
| 19 | 12.90 | 0.7487 (3%) | 24.9796 | 0.5000 (1%) | 0.4646 | 3.0069 (12% FVP) | 59.94 | 20.35 | 1600 | 210 |
| 20 | 12.14 | 0.7515 (3%) | 25.0017 | 1.0021 (2%) | 0.7159 | 2.7540 (11%) | 60.02 | 20.41 | 1050 | 80.6 |
| 21 | 9.48 | 0.7545 (3%) | 25.0213 | 6.5052 (13%) | 3.4674 | N/A | 59.91 | 17.72 | 779 | 8.1 |

> > Off scale

EXAMPLE 16

An aqueous solution of oxalic acid was prepared that contained 1.7068 g oxalic acid (as $H_2C_2O_4 \cdot 2H_2O$) to 20.0468 g $H_2O$. To the oxalic acid solution 56:8370 g of Cabot B-10 barium titanate is slowly added with high shear mixing (nominally 5000 rpm). Polyethyleneimine (PEI made by Kodak, 50% in water) at 1.1349 g was added to the oxalic acid/barium titanate suspension under the same mixing shear as discussed above. Then 1.6778 g of binder (Carbowax PEG 1450F, Union Carbide) was added to the existing suspension. The final slip contained 3% oxalic acid, 1% PEI, and 3% binder as compared to the total weight percent of 69.82 (28.63 volume percent) for the barium titanate powder. The slip was shear thinning with an apparent viscosity of 428 cps. Green layers were prepared in accordance with the procedure of EXAMPLE 1.

What is claimed is:

1. A ceramic powder suspension comprising:
   a ceramic powder having an average particle size of less than 0.5 micron suspended in an aqueous fluid, the ceramic powder being present in a quantity of up to 30 percent, by volume, of total solids in the suspension;
   a passivating layer formed on surfaces of the ceramic powder comprising a passivating agent and at least one species of the powder, the passivating agent being present in an amount between 0.5 and 5 percent by weight of the ceramic powder; and
   a dispersant coating on the passivating layer, the dispersant being present in an amount of at least 1 percent by weight of the ceramic powder,
   wherein the ceramic powder is suspended in the aqueous fluid in a substantially unagglomerated state and the powder suspension has an apparent viscosity of less than $3 \times 10^{-6}$ Mpa-s (3000 cps).

2. The ceramic powder suspension of claim 1, wherein the passivating agent and the dispersant are present in amounts sufficient to enable the particles remain suspended in the aqueous fluid for a time period of one week.

3. The ceramic powder suspension of claim 1, wherein the passivating agent is soluble in the aqueous fluid.

4. The ceramic powder suspension of claim 1, wherein the ceramic powder comprises a complex metal oxide having the formula of $ABO_3$, wherein A is at least one metallic species selected from the group consisting of barium, calcium, magnesium, lead, strontium, and zinc, and wherein B is at least one metallic species selected from the group consisting of hafnium, tin, titanium and zirconium, or mixtures or solid solutions thereof.

5. The ceramic powder suspension of claim 4, wherein the complex metal oxide comprises barium titanate.

6. The ceramic powder suspension of claim 1, wherein the passivating layer comprises at least one metallic species of the powder.

7. The ceramic powder suspension of claim 6, wherein the metallic species has a solubility in the aqueous fluid between $10^{-4}$ moles per liter and $10^{-1}$ moles per liter.

8. The ceramic powder suspension of claim 1, wherein the ceramic powder comprises one or more dopants selected from the group consisting of oxides of aluminum, antimony, bismuth, boron, calcium, cadmium, chromium, copper, cobalt, hafnium, iron, lanthanum, lead, manganese, molybdenum, neodymium, nickel, niobium, praseodymium, samarium, scandium, silicon, silver, tantalum, titanium, tin, tungsten, vanadium, yttrium, zinc and zirconium.

9. The ceramic powder suspension of claim 1, wherein the passivating agent is selected from the group consisting of succinates, benzoates, formates, cupferrons, 8-hydroxyquinoline, oxalic acid, and mixtures thereof.

10. The ceramic powder suspension of claim 1, wherein the ceramic powder is present in a quantity of between 17.72 and 30 percent, by volume, of total solids in the suspension.

11. The ceramic powder suspension of claim 1, wherein the ceramic powder has a zeta potential in the range of +10 to +40 millivolts or −10 to −40 millivolts.

12. The ceramic powder suspension of claim 1, wherein the ceramic powder suspension has a Bingham yield point of less than 2300 $N/m^2$.

13. The ceramic powder suspension of claim 1, further comprising a quantity of an organic binder.

14. The ceramic powder suspension of claim 1, wherein the dispersant is adsorbed by the passivating layer.

15. The ceramic powder suspension of claim 1, wherein the dispersant uniformly coats the passivating layer.

16. A method of forming a ceramic powder suspension comprising:

mixing ceramic powder having an average particle size of less than 0.5 micron in an aqueous fluid containing a passivating agent, in an amount between 0.5 and 5 percent by weight of the ceramic powder, and forming a passivating layer on surfaces of the ceramic powder; and mixing a dispersant, in an amount of at least 1 percent by weight of the ceramic powder, in the aqueous fluid to form the ceramic powder suspension in a substantially unagglomerated state, wherein the ceramic powder suspension includes a quantity of up to 30 percent, by volume of total solids, of the ceramic powder and has an apparent viscosity of less than $3 \times 10^{-6}$ MPa-s (3000 cps).

17. The method of claim 16, wherein the passivating layer is formed by reacting the passivating agent and at least one species of the powder.

18. The method of claim 16, wherein the passivating layer is formed by reacting the passivating agent and at least one metallic species of the powder.

19. The method of claim 18, wherein the metallic species has a solubility in the aqueous fluid between $10^{-4}$ moles per liter and $10^{-1}$ moles per liter.

20. The method of claim 16, wherein the dispersant coats the passivating layer.

21. The method of claim 16, wherein the dispersant uniformly coats the passivating layer.

22. The method of claim 16, wherein the dispersant is adsorbed by the passivating layer.

23. The method of claim 16, wherein the passivating agent and the dispersant are present in amounts sufficient to enable the particles remain suspended in the aqueous fluid for a time period of one week.

24. The method of claim 16, wherein the passivating agent is soluble in the aqueous fluid.

25. The method of claim 16, wherein the ceramic powder comprises a complex metal oxide having the formula of $ABO_3$, wherein A is at least one metallic species selected from the group consisting of barium, calcium, magnesium, lead, strontium, and zinc, and wherein B is at least one metallic species selected from the group consisting of hafnium, tin, titanium and zirconium, or mixtures or solid solutions thereof.

26. The method of claim 25, wherein the complex metal oxide comprises barium titanate.

27. The method of claim 16, wherein the ceramic powder comprises one or more dopants selected from the group consisting of oxides of aluminum, antimony, bismuth, boron, calcium, cadmium, chromium, copper, cobalt, hafnium, iron, lanthanum, lead, manganese, molybdenum, neodymium, nickel, niobium, praseodymium, samarium, scandium, silicon, silver, tantalum, titanium, tin, tungsten, vanadium, yttrium, zinc and zirconium.

28. The method of claim 16, wherein the passivating agent is selected from the group consisting of succinates, benzoates, formates, cupferrons, 8-hydroxyquinoline, oxalic acid, and mixtures thereof.

29. The method of claim 16, wherein the ceramic powder suspension includes a quantity of between 17.72 and 30 percent, by volume, of ceramic powder.

30. The method of claim 16, wherein the ceramic powder has a zeta potential in the range of +10 to +40 millivolts or −10 to −40 millivolts.

31. The method of claim 16, wherein the ceramic powder suspension has a Bingham yield point of less than 2300 $N/m^2$.

32. The method of claim 16, further comprising mixing a quantity of an organic binder into the ceramic powder suspension.

* * * * *